(12) United States Patent
Isloorkar

(10) Patent No.: US 10,380,030 B2
(45) Date of Patent: Aug. 13, 2019

(54) CACHING OF VIRTUAL TO PHYSICAL ADDRESS TRANSLATIONS

(71) Applicant: ARM LIMITED, Cambridge (GB)

(72) Inventor: Nitin Isloorkar, Bangalore (IN)

(73) Assignee: ARM Limited, Cambridge (GB)

( * ) Notice: Subject to any disclaimer, the term of this patent is extended or adjusted under 35 U.S.C. 154(b) by 519 days.

(21) Appl. No.: 13/705,318

(22) Filed: Dec. 5, 2012

(65) Prior Publication Data

US 2014/0156930 A1   Jun. 5, 2014

(51) Int. Cl.
*G06F 12/1027* (2016.01)

(52) U.S. Cl.
CPC .... *G06F 12/1027* (2013.01); *G06F 2212/654* (2013.01); *G06F 2212/681* (2013.01)

(58) Field of Classification Search
CPC .. G06F 12/10; G06F 12/1063; G06F 2212/50; G06F 2212/602
USPC ........................................................ 711/122
See application file for complete search history.

(56) References Cited

U.S. PATENT DOCUMENTS

| | | | | |
|---|---|---|---|---|
| 6,628,294 | B1* | 9/2003 | Sadowsky et al. | 345/568 |
| 2006/0101209 | A1* | 5/2006 | Lais | G06F 12/082 711/137 |
| 2007/0043929 | A1* | 2/2007 | Safford et al. | 711/207 |
| 2007/0055824 | A1 | 3/2007 | Diefendorff et al. | |
| 2007/0113044 | A1* | 5/2007 | Day | G06F 12/1027 711/207 |
| 2007/0153014 | A1* | 7/2007 | Sabol | 345/557 |
| 2008/0222383 | A1 | 9/2008 | Spracklen et al. | |
| 2010/0011170 | A1* | 1/2010 | Murayama | G06F 12/0851 711/137 |
| 2010/0250853 | A1 | 9/2010 | Krieger et al. | |
| 2010/0332786 | A1 | 12/2010 | Grohoski et al. | |
| 2011/0023027 | A1* | 1/2011 | Kegel et al. | 718/1 |
| 2013/0227245 | A1* | 8/2013 | Gupta | G06F 12/1027 711/205 |

OTHER PUBLICATIONS

A Bhattacharjee et al., "Inter-Core Cooperative TLB Prefetchers for Chip Multiporcessors," ASPLOS '10, Mar. 2010, 12 pages.*

(Continued)

*Primary Examiner* — Tracy A Warren
(74) *Attorney, Agent, or Firm* — Nixon & Vanderhye, P.C.

(57) ABSTRACT

A data processing apparatus comprising: at least one initiator device for issuing transactions, a hierarchical memory system comprising a plurality of caches and a memory and memory access control circuitry. The initiator device identifies storage locations using virtual addresses and the memory system stores data using physical addresses, the memory access control circuitry is configured to control virtual address to physical address translations. The plurality of caches, comprise a first cache and a second cache. The first cache is configured to store a plurality of address translations of virtual to physical addresses that the initiator device has requested. The second cache is configured to store a plurality of address translations of virtual to physical addresses that it is predicted that the initiator device will subsequently request. The first and second cache are arranged in parallel with each other such that the first and second caches can be accessed during a same access cycle.

16 Claims, 9 Drawing Sheets

(56) References Cited

OTHER PUBLICATIONS

Torres, G., "How the Cache Memory Works: n-Way Set Associative Cache," Sep. 12, 2007.*
Bhattacharjee et al. ("Inter-Core Cooperative TLB Prefetchers for Chip Multiprocessors," ASPLOS'10 Mar. 2010, 12 pages).*
"Pseudo-LRU" From Wikipedia.org, Aug. 2012.
UK Search Report dated Jun. 12, 2014 in GB 1318354.6 (2 pages).
GB Search Report dated Mar. 19, 2014 in GB 1318354.6.
G.B. Kandiraju et al, "Going the Distance for TLB Prefetching: An Application-driven Study" Proceedings of the $29^{th}$ Annual International Symposium on Computer Architecture (ISCA'02), May 2002, 12 pages.
A. Bhattacharjee et al, "Inter-Core Cooperative TLB Prefetchers for Chip Multiprocessors" ASPLOS'10 Mar. 2010, 12 pages.

\* cited by examiner

CACHING OF VIRTUAL TO PHYSICAL ADDRESS TRANSLATIONS

TECHNICAL FIELD

The technical field relates to data processing and in particular to the translations of virtual to physical addresses within data processing systems.

BACKGROUND

Data processing systems may use virtual addresses to indicate storage locations while the processing system uses physical addresses that represent actual locations on the silicon to store the data in. Virtual addresses may be used to reduce the number of bits required to identify an address location or to allow several processes to access a restricted memory space.

A complete set of current mappings for the virtual to physical addresses are stored in memory, however in order to decrease access time to these mappings, recently used mappings are stored in caches that can be accessed more quickly by the processor. There may be an L1 cache that is fast to access and acts as a micro TLB and stores a small subset of recently used mappings, and a slower L2 cache that is the macro TLB and stores a set of currently used mappings while a full set of page tables of mappings are stored in memory.

The mapping of virtual to physical address space is done in blocks and these may vary in size, thus, these are for example blocks of 1 Gbyte, 2 Mbyte or 4 Kbyte. The number of bits that need to be mapped for a translation depends on the size of the block that an address is located in. If, for example, an address is in a 2 Mbyte block, then only the higher n to 21 bits need to be found from the translation tables, while if it is in the 4 Kbyte block then the n to 12 bits need to be found.

The mappings and the final page sizes are therefore stored in tables in the memory, with the first n to 31 bits that represent 1 Gbyte blocks, being stored in a first table, the next 30 to 21 bits being stored in a next table and so on. A page table walk in memory that is used to retrieve the mappings is performed in steps or walks and where the address is in a larger block only the first step(s) needs to be performed.

When a mapping has been found following a page table walk it is stored in the L2 macro TLB and in the L1 micro TLB.

As can be appreciated retrieving these mappings from memory is expensive in both time and power.

In order to increase efficiency in some data processing systems, the RAM used as the level 2 cache for the macro TLB is also used as a walk cache and as a prefetch buffer, such that in addition to retrieving the requested mapping, a mapping for the subsequent virtual address is retrieved during the same page table walk. This can then be written into the prefetch buffer, after the originally requested mapping has been written into the macro TLB.

The walk cache will store intermediate translations following some of the page table walks, the stored values being an input to a final page table walk required to finish the translation.

In some systems there may be double virtualisation. This occurs where there are several guest OSs and each references a large amount of memory. The memory of the data processing system is not sufficiently large from them to all to reference different distinct portions of memory. Instead they share some memory area but this is not visible to them and is managed by the hypervisor with each guest OS using intermediate physical addresses IPA, that the hypervisor then maps to real physical addresses. In this way the hypervisor controls the memory use and allows each guest OS to believe it has sight of a large dedicated memory space. In this case each guest OS manages the page tables for the VA to IPA translations and the hypervisor manages tables of translations from IPA to PA. In these cases an IPA2PA cache may be provided in the level 2 RAM storing intermediate steps in the IPA to PA translations.

SUMMARY

A first aspect provides a data processing apparatus comprising: at least one initiator device for issuing transactions, a hierarchical memory system comprising a plurality of caches and a memory and memory access control circuitry, said initiator device identifying storage locations using virtual addresses and said memory system storing data using physical addresses, said memory access control circuitry being configured to control virtual address to physical address translations; wherein said plurality of caches, comprise a first cache and a second cache;

said first cache being configured to store a plurality of address translations of virtual to physical addresses that said initiator device has requested; and said second cache being configured to store a plurality of address translations of virtual to physical addresses that it is predicted that said initiator device will subsequently request; wherein said first and second cache are arranged in parallel with each other such that said first and second caches can be accessed during a same access cycle.

The technology described herein recognises that the retrieval of address translations from memory may be a time consuming process. It also recognises that many memory accesses are performed in an ordered manner such that when one translation is required the next translation that is likely to be required may be to some to extent predictable. Thus, it may be that for much of the time translations are retrieved consecutively, or every other translation is retrieved, or some other general rule may be followed which allows the next translation required to be predicted with some degree of accuracy. Thus, fetching two translations together and storing them in parallel in two caches enables their accesses to be performed efficiently. Although the use of two parallel caches has a slight area overhead, the performance improvement is considerable.

In this way by recognising that it would be advantageous to store translations in caches in parallel, the time to store the translations and access them is improved.

It should be noted that an initiator device is any device that issues transactions thus, it may be a master such as a processor, a GPU, a DMA.

In some embodiments, said memory access control circuitry is configured in response to receipt of a request for an address translation from said initiator device, to look for said translation in said first cache and said second cache and in response to said requested translation not being present, to retrieve said translation from a lower hierarchical data store and to retrieve a translation for a speculative subsequently required virtual address while accessing said lower hierarchical data store and to update said first cache with said retrieved translation and said second cache with said retrieved speculative subsequently required translation at a same time.

The present technique recognises that many memory accesses are performed in an ordered manner such that when one translation is required a the one that is likely to be required next can be predicted, and it therefore fetches a requested translation and a predicted next translation in a same access. In this way the time to retrieve the two is reduced and as they are fetched together they are ready to be stored at a same time. If these two fetched translations were to be stored in a single cache this would require two sequential accesses to the cache. However, by providing two caches that are arranged in parallel the access can be made in parallel in some cases in a single access cycle thereby improving performance.

In some embodiments, said first cache comprises a macro table lookaside buffer and said second cache comprises a prefetch buffer.

The first cache may be a macro table look aside buffer and the second cache a prefetch buffer storing translations for transactions that it has been predicted the master or initiator will issue.

In some embodiments, said first cache and said second cache comprise level two caches, said data processing apparatus comprising a level one cache comprising a to micro table lookaside buffer, said memory being configured to store address lookup tables comprising virtual to physical address translations.

The hierarchy of the system may be such that the macro TLB is a level 2 cache and there is a level 1 micro TLB storing a subset of the translations and a memory that stores the page tables for the complete set of virtual to physical address translations.

In some embodiments, said memory access control circuitry is configured in response to detecting said requested translation in said second cache to transfer said translation to a same line of said first cache.

In some embodiments if the memory access control circuitry detects the currently requested transaction is in the second cache then it will transfer it to the first cache and in some cases to the same line in the first cache. This means that where for example a predicted translation has been stored in the prefetch buffer it is a simple matter to retrieve and then remove it from the second cache and store it in the first cache, having the caches arranged in parallel facilitates this procedure. Although the translation may not be stored in the same line in the first cache, it may be in cases where the two caches are of a same size and the translations are indexed by virtual address, such that the virtual address determines the storage location. In many embodiments the two caches may not have the same size and the storage of translations may be indexed in a different way.

In some embodiments, said data processing apparatus comprises a data processing apparatus configured to operate a double virtualisation system that uses a set of virtual addresses and a set of intermediate physical addresses, wherein an operating system operating on said data processing apparatus uses said set of virtual addresses and said intermediate set of physical addresses, and a hypervisor manages the memory space by translating said set of intermediate physical addresses to physical addresses, said data processing apparatus further comprising:

a third cache and a fourth cache;

said third cache being configured to store a plurality of partial virtual to physical address translations, said partial translations comprising translations for higher bits of said addresses, said partial translations forming an input to a lookup to memory required for completing said translations; and said fourth cache being configured to store a plurality of partial translations of said intermediate physical addresses to corresponding physical addresses, said plurality of partial translations corresponding to results from lookup steps performed in lookup tables in said memory during said translation; wherein said memory access control circuitry is configured to store in said fourth cache a final step in said intermediate physical address to physical address translation at a same time as storing said partial translation in said third cache.

Many modern systems use double virtualisation so that they can support plural guest operating systems that may each access large sections of memory. A hypervisor will manage this by providing intermediate physical addresses that the guest operating systems will regard as the real physical addresses. Such a system requires further address translations and where two caches have been provided in parallel for physical address to virtual address translations further caches can also be arranged in parallel to store translations relating to the conversion of intermediate physical addresses to physical addresses. It may be advantageous to store partial translations as retrieving translations from memory is a lengthy process requiring several steps or walks. The first few steps may be common to translations within a block of memory and thus may be used by several different translations. Thus, storing these partial translations will reduce the steps required for these later translations. Similarly, with the intermediate physical address to physical address translations these may be used frequently as a particular intermediate physical address space may be used by the hypervisor to service several guest OS's. Thus, the intermediate steps in the translation may be required several times within a relatively short timeframe and therefore caching these can improve performance.

It should be noted that the third cache may be present without the fourth cache in cases where there is no double virtualisation.

The present technique also recognises that where a nested translation is occurring then one of the translations of the intermediate physical address to a corresponding physical address step will be performed at the end of the partial virtual to physical address translation and thus, the result for these two will be retrieved from the page tables at the same time and thus, if the two caches storing this information are arranged in parallel the results can be written in the same access step, once again saving time.

In some embodiments, said third cache comprises a walk cache and said fourth cache comprises an IPA2PA translation lookaside buffer.

A walk cache is a cache that stores a pointer to the final step in the page table walk for a virtual to physical address translation while an IPA2PA translation lookaside buffer stores the intermediate physical to physical address partial translation steps.

In some embodiments, said first and second caches each comprise four set associative RAMs.

Although the caches may be formed in a number of ways, a four way set associative cache is a way of storing the data in a way that provides a reasonable hit rate without too high hardware overheads.

In some embodiments, said first, second, third and fourth caches are formed from RAMs, said first and second caches being on different RAMs and said third and fourth caches being on different RAMs.

If two RAMs are provided to form the first and second caches then it is convenient if the third and fourth caches are placed in the same parallel RAMs. In this way two parallel RAMs will provide four caches. If the caches are formed of 4 way set associative caches then each way is formed from a RAM so that each cache is formed of four set associative RAMs and the first and second caches are in different sets and similarly the third and fourth caches are in different sets, the first and either third or fourth being in the same set, while the second and either fourth or third are in the same set. It has been found that the first and second caches are convenient if arranged in parallel as there may be accesses that to these two that are requested at the same time and therefore performing them is efficient. Furthermore, the third and fourth caches have accesses that may be made at the same time and therefore arranging them in parallel also provides improved performance. Providing four RAMs in parallel would require additional area and would not provide an advantage as in general the third and fourth caches are not updated at the same time as the first and second are.

In some embodiments, said memory access control circuitry is configured to detect a request to invalidate a set of translations for a context and in response to detection of said invalidate request to perform said invalidation and while said invalidation is pending:

to determine whether any update or lookup requests for said context are received; and in response to detecting a lookup request, said memory access control circuitry is configured to signal a miss in said plurality of caches without performing said lookup; and in response to detecting an update request said memory access control circuitry is configured to transmit an accept reply to said update request and not to perform said update.

The present technique recognises that in hierarchical memory systems that use address translations there may be times when the processor or other master switches context and the software controlling the master or the hypervisor sends a request to invalidate a set of translations from a context where the context has completed for example. It will then send this invalidate response to the control circuitry that controls the coherency of these hierarchical memories. There may be pending update requests for some of the translations that are being invalidated and therefore it is advantageous if the memory access control circuitry can in response to detecting an invalidation request, determine whether any update or lookup request for that context has been received and where the lookup request has been received to simply signal a miss without performing the lookup and where an update request has been received to transmit an accept reply to the update request and not perform the update. Performing the lookup and the updates would simply cost power and take time and as these entries will be invalidated there is no need to perform them. However, it is important that nothing is stalled waiting for them to complete and therefore it is convenient if accept replies and miss signals are sent.

A second aspect provides a data processing apparatus comprising: a initiator device for issuing a stream of transaction requests, a hierarchical memory system comprising a plurality of caches and a memory and memory access control circuitry, wherein said initiator device identifies storage locations using virtual addresses and said memory system stores data using physical addresses, said memory access control circuitry being configured to control virtual address to physical address translations; wherein said memory access control circuitry is configured to detect a request to invalidate a set of virtual to physical address translations for a context and in response to detection of said invalidate request to perform said invalidation and while said invalidation is pending:

to determine whether any update or lookup requests for said context are received; and in response to detecting a lookup request said memory access control circuitry is configured to signal a miss in said plurality of caches without performing said lookup; and in response to detecting an update request said memory access control circuitry is configured to transmit an accept update request reply and not perform said update.

As noted previously where address translations for a context are to be invalidated then it is convenient if the memory access control circuitry can control this process and detect any update or lookup requests and not process them. Thus, update requests can be accepted and then simply dropped while lookup requests will signal a miss in the caches but will not actually perform the lookup. As noted previously this will save power and avoid performing any unnecessary accesses to the cache and as responses have been sent there will be no upstream transactions waiting for them to complete. It may, however, in some cases decrease the hit rate. This occurs, where for example, the page table to be invalidated is a smaller sized page table say 4K. In such a case the larger tables need to be accessed first before knowing that the page size is 4k. The invalidate may not affect the larger sized table, but the lookup to this table is still sent back as a miss.

A third aspect provides a method of storing virtual to physical address translations in a plurality of caches comprising the steps of:

receiving a request for a virtual to physical address translation from an initiator device;

in response to determining that said address translation is not stored in one of said plurality of caches;

retrieving said translation from a lower hierarchical data store and also retrieving a translation for a predicted subsequent virtual address;

updating a first cache with said retrieved translation; and updating a second cache with said retrieved subsequent translation in a same access cycle.

A fourth aspect provides a data processing apparatus comprising: at least one initiator means for issuing transactions, a hierarchical memory system comprising a plurality of caches and a memory and memory access control means, said initiator means identifying storage locations using virtual addresses and said memory system storing data using physical addresses, said memory access control means being for controlling virtual address to physical address translations; wherein said plurality of caches, comprise a first caching means and a second caching means;

said first caching means being for storing a plurality of address translations of to virtual to physical addresses that said initiator means has requested; and said second caching means being for storing a plurality of address translations of virtual to physical addresses that it is predicted that said initiator device will subsequently request; wherein said first and second caching means are arranged in parallel with each other such that said first and second caching means can be accessed during a same access cycle.

The above, and other objects, features and advantages of this invention will be apparent from the following detailed description of illustrative embodiments which is to be read in connection with the accompanying drawings.

DESCRIPTION OF THE EXAMPLE
NON-LIMITING EMBODIMENTS

Figure 1:
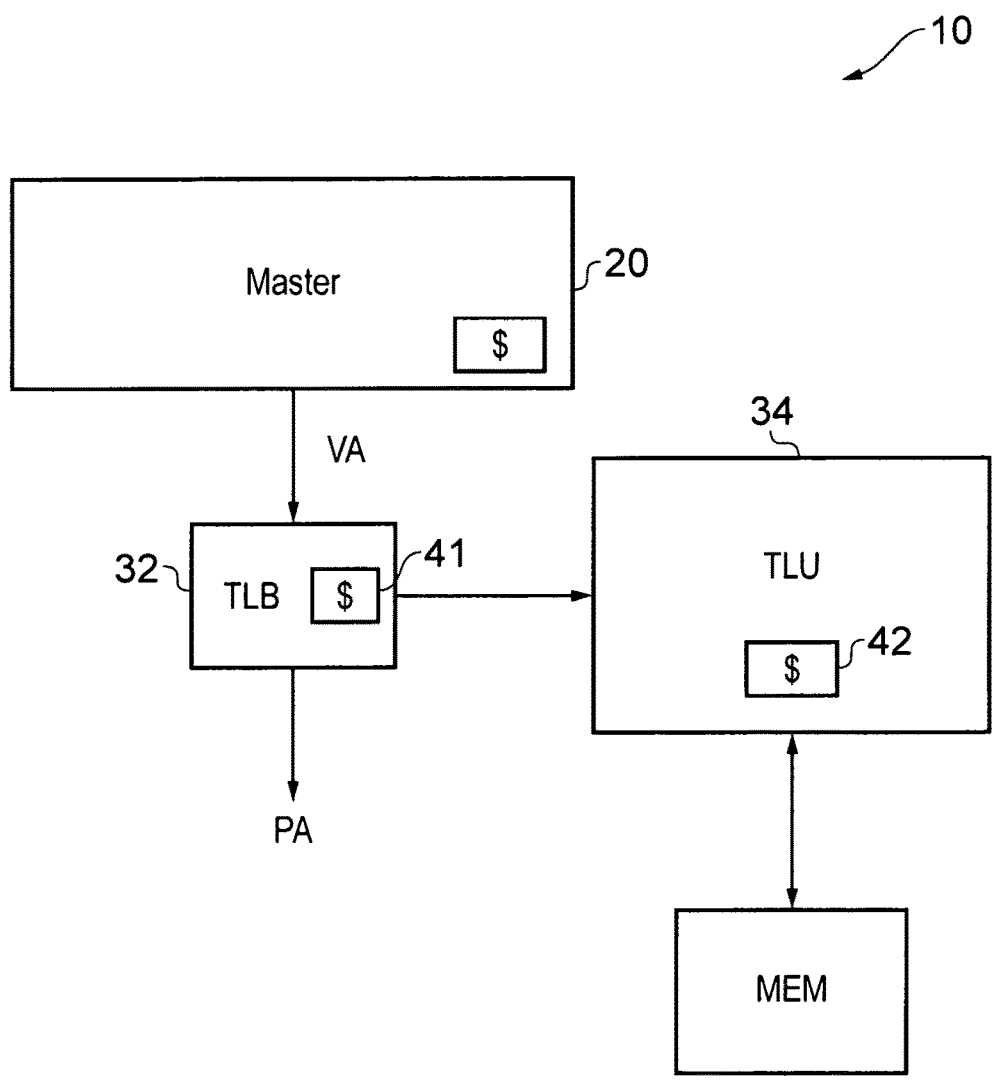
FIG. 1 shows a data processing apparatus according to the present technique.

FIG. 1 shows a data processing apparatus 10 according to the present technique. The data processing apparatus 10 comprises a master 20 that issues requests that identify storage locations using virtual addresses. These virtual addresses are sent for translation via translation look aside buffer TLB 32 which has a fully associative micro TLB cache 41 within it. The cache is queried and if a translation for that virtual address is stored within the cache 41 a corresponding physical address is output. If the virtual address is not stored in cache 41 then a miss is recorded and the query is sent further to the translation look aside unit 34 which has caches 42 within it comprising a macro TLB and a prefetch buffer arranged in 2 parallel caches. The translation is looked for in this cache and if it is not found a page table walk of page tables stored in memory 44 is instructed.

Figure 2:
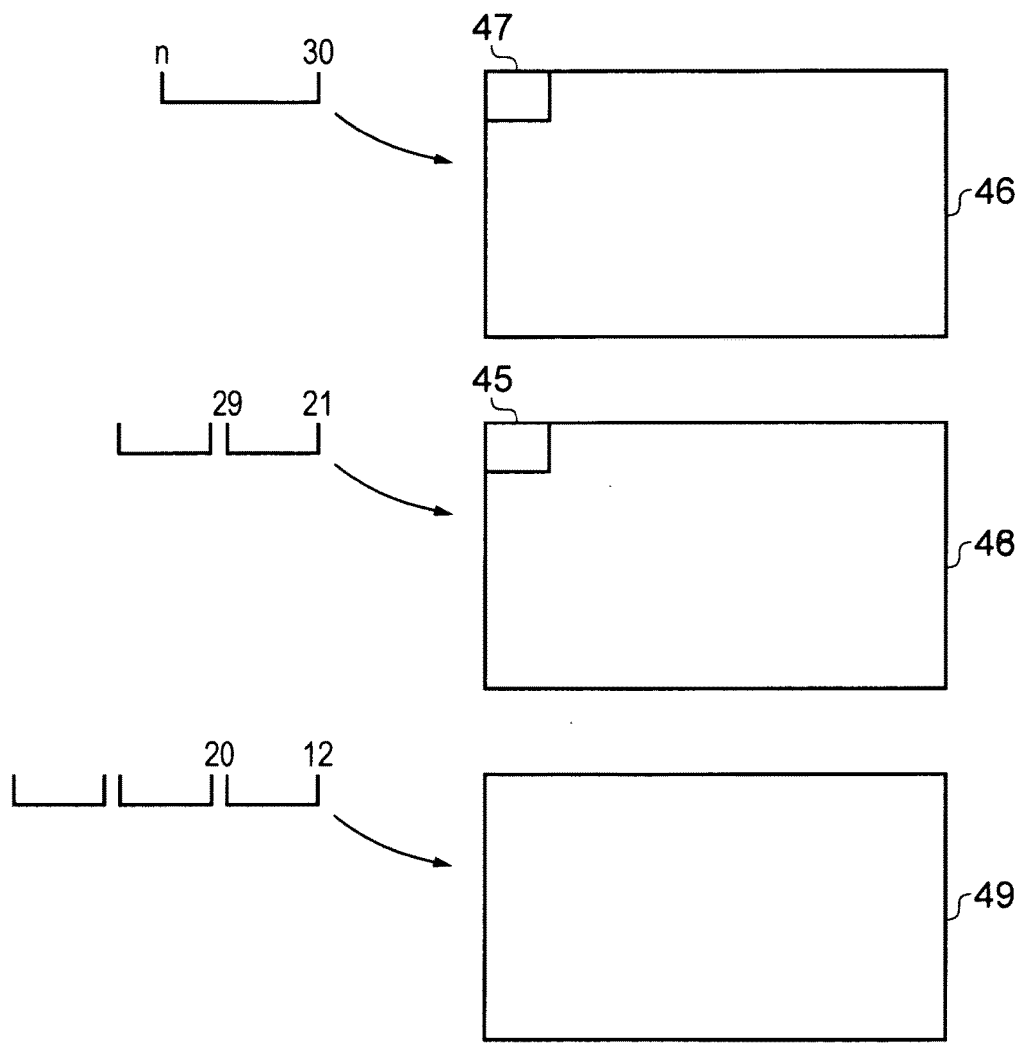
FIG. 2 shows a configuration for storing page walk tables.

FIG. 2 shows schematically how the page tables of the translations are stored within memory 44. As the memory may be mapped in different sized blocks the translations are stored in tables corresponding to these block sizes. Thus, if the memory is mapped in large sized blocks only the translation for the higher order bits is needed as the rest of the mapping will be flat mapped and will follow normal ordering. Thus, a match of only a few higher order bits is needed in this case and therefore it would be very inefficient to match all the bits in the address. Thus, when the first page table 46 is accessed an indicator 47 indicates whether for the address given the memory block is mapped in blocks of this large size or not. A comparison is then done of the first n to m bits. In this example the largest sized block that is mapped is a gigabyte and therefore the n to 30 bits are compared in the first comparison and the physical address corresponding to the virtual address for those bits is output. If the indicator 47 had indicated that the virtual address was an address that is mapped in gigabyte blocks then this is the only answer that is required and this is output and the page table walk is done in a single step.

If however, the indicator indicates that the address is mapped in smaller sized blocks then the next table 48 is accessed and the next bits in this case bits 29 to 21 are compared and if the indicator bit 45 indicates that the address is in a block that's 2Mbytes large then the answer is output and the translation has been performed in two steps. If however, the indicator did not indicate this then the third step is performed and a comparison is made in table 49 of bits 20 to 12. This is the smallest size of blocks being 4kbytes that is mapped at any one time and thus, an answer is output at this point. Thus, the page table walk may take 1, 2 or 3 steps depending on the size of the blocks that are mapped. As can be appreciated this can take considerable amounts of time.

In order to reduce the amount of time that is required for these page table walks, it may be advantageous to fetch not just the translation for the virtual address requested but also the translation for the predicted subsequent virtual address that is required. This translation will probably be needed next and thus can be stored in a to prefetch butter with the requested translation being stored in the macro TLB. As both translations arrive at almost the same time from the main memory, updating the caches at the same time has minimal impact on the hit rate. That is, if updating of the macro TLB awaits the next required translation that is to be stored in the prefetch buffer before being performed, then this wait needs to be small if the hit rate is not to be affected. As the translations arrive at almost the same time, this is the case and the number of intervening lookups to the virtual address table of a pending update to the macro TLB will be extremely small.

Figure 3:
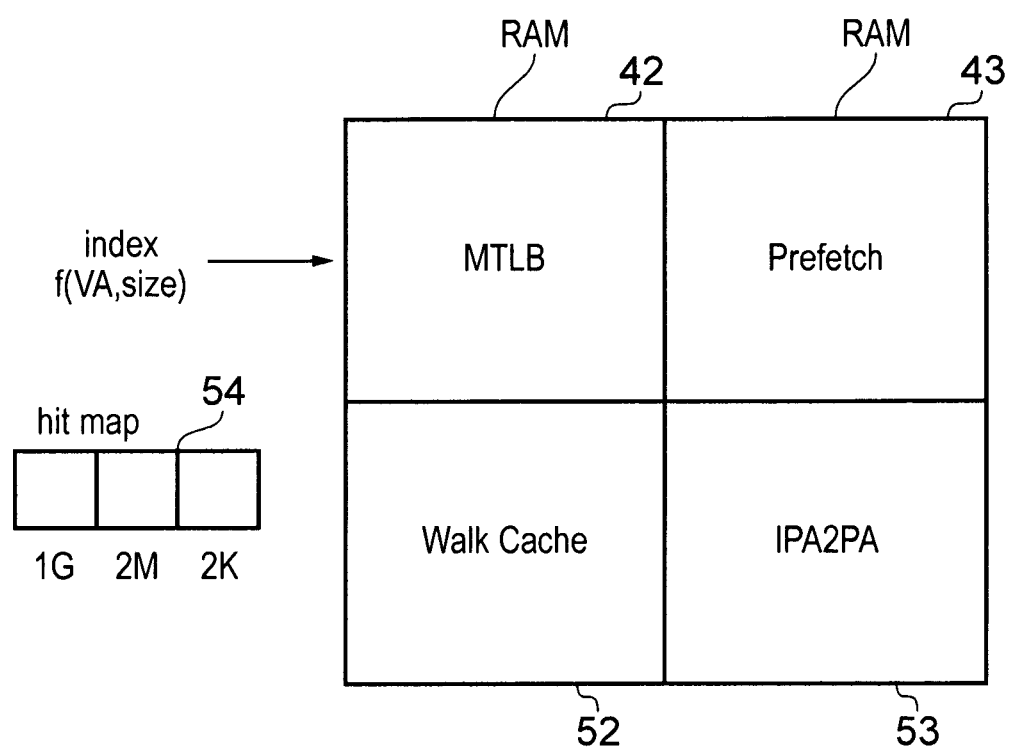
FIG. 3 shows caches used to store information relating to virtual to physical address translations.

FIG. 3 shows an example of macro TLB 42 located in one RAM and a prefetch buffer 43 located in a parallel RAM. Having these two buffers in two parallel RAMs arranged in this way allows the two translations retrieved from the page table walk to be written into the RAMs in the same access cycle(s). This reduces the time required for this step. Although they are described as being in two parallel RAMs in some embodiments the caches take the form of 4-way set associative caches and in such a case each way of the caches comprises a RAM and the macro TLB and prefetch buffer are in different sets.

The L2 cache or macro TLB 42 may also comprise other caches, a walk cache 52 and an IPA2PA cache 53 also arranged in parallel with each other.

As noted previously, page table walks can take a reasonable length of time. This can be considerably longer where double virtualisation is used. Double virtualisation is used where multiple guest OS's and a hypervisor are run on one system. Each guest OS may require access to large amounts of memory and the system may not be able to provide these large amounts of memory for each of the OS's. This problem is addressed by having a hypervisor that manages the memory space. It allocates intermediate physical addresses to each of the OS's. These are not real physical addresses but act like virtual addresses with the hypervisor managing page tables of mappings of the intermediate physical addresses to real physical addresses. The guest OS's then use virtual addresses and map these virtual addresses to what it believes to be physical addresses but are in fact intermediate physical address mapping.

The walk cache 52 stores entries for the final step in the page table walk. Therefore, it may be the pointer to the location in the 4Kbyte table for a VA to PA translation or in an IPA to PA translation it may be the input for the final page table walk that is the IPA retrieved during the penultimate page table walk that acts as a to pointer indicating where to read the translation in the final page table.

The IPA2PA cache 53 stores the intermediate physical address to physical address translations. The address space used for different OS's at any one time is spatially close and thus, the intermediate steps in the IPA to PA translations may be used across different OS's in a relatively short time and thus, caching them and providing easy access is convenient and improves performance. The steps performed in the translations will be explained in more detail in FIG. 4.

There is a hit map 54 associated with each of the caches, and this contains an indication of the number of pages of a certain size that are cached in a particular cache. Where the value is 0 the lookup to the cache can be made more efficient by not looking in storage locations that store this size of page. In this regard, the size of page is indexed by the virtual address and the size of the page.

Figure 4A:
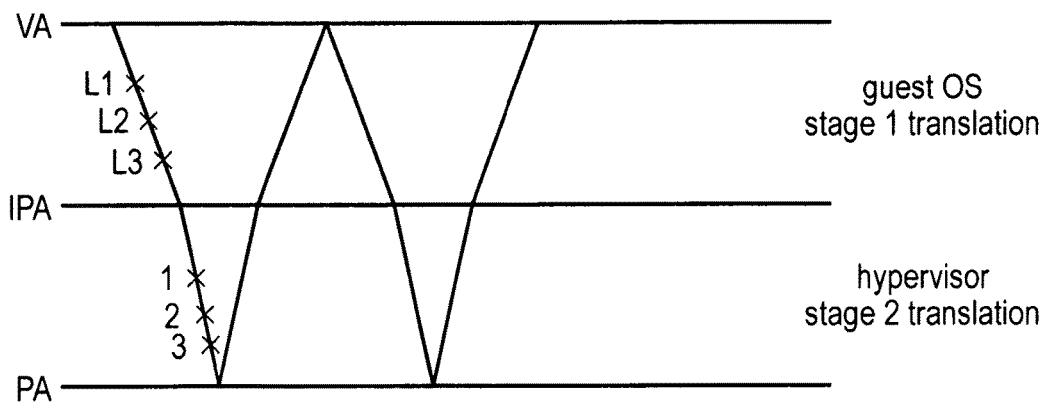
FIGS. 4a and 4b schematically show steps in a nested address translation.
Figure 4B:
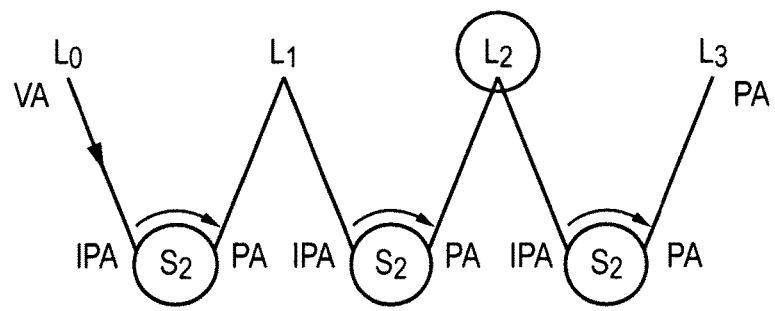

FIGS. 4a and 4b show schematically nested translations, wherein a virtual address is mapped to a physical address via an intermediate physical address. Stage 1 of the mapping which maps virtual addresses to intermediate physical addresses is performed under control of the guest OS. In this regard the guest OS believes it is mapping to a final physical address. Stage 2 of the mapping maps the intermediate physical address to the physical address and this is performed under control of the hypervisor.

FIG. 4a shows schematically the guest OS controlling mappings between a virtual address and the intermediate physical address and performing perhaps three steps for each translation, while the hypervisor controls mappings between the intermediate physical address and physical address for the guest OS and will perform page table walks itself for each of the steps.

FIG. 4b shows an example of the steps performed in retrieving a mapping for a translation mapped in block sizes of 4Kbytes. Initially a lookup of the virtual address is performed in the first largest size page table (say 1 Gbyte) and the IPA mapping for the higher bits of the address is retrieved. The hypervisor will take this result and do its own walk in its own page tables to translate this intermediate physical address to a physical address.

In the next step the guest OS does a page table walk in the second page table and looks for the virtual address mapping for the lower bits and similarly the hypervisor will translate the mapping of the intermediate physical address found in to the second step to a physical address in its own mapping table. The third step may then be performed and a physical address eventually output. As can be appreciated these steps take a lot of time and it is convenient if some of them can be stored in the level 2 cache to potentially reduce latency.

Thus, as can be seen in FIG. 3 a cache may be provided that has a walk cache and an IPA2PA cache. The walk cache stores a result from the penultimate request which then requires just one further walk, thus in the example of FIG. 4b it is the IPA returned in the L2 step. The IPA2PA cache stores the intermediate steps in the stage 2 translations, that is the walks performed illustrated by the S2 bubbles in FIG. 4b. These provide an input for a lookup to memory that is required for completing the translation. It is important to note that the eviction algorithm does not differentiate between different types (different intermediate steps) of the IPA to PA mappings.

As the translations that are to be stored in the walk cache and the IPA2PA cache are retrieved at similar times, it is convenient if they can be written into the two caches in the same step. Thus, as the macro TLB and the prefetch buffer have been instantiated as parallel RAMs it is convenient if these two parallel RAMs are used for the walk cache and the IPA2PA respectively. Thus, these are arranged in the example of FIG. 3 with the walk cache in the same RAM as the macro TLB and the IPA2PA in the same RAM as the prefetch buffer. It will be clear to a skilled person that this arrangement could be switched and the IPA2PA could be in the same RAM as a macro TLB and the walk cache in the same RAM as the prefetch buffer.

Figure 5:
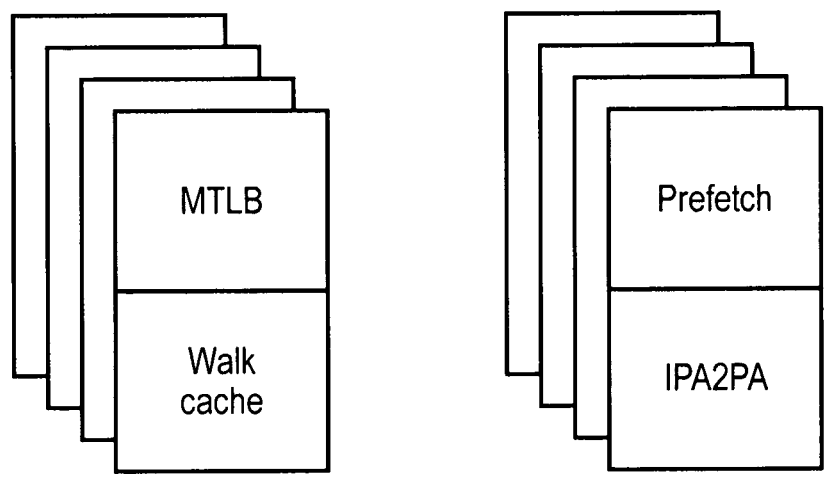
FIG. 5 shows four way set associative caches.
Figure 6:
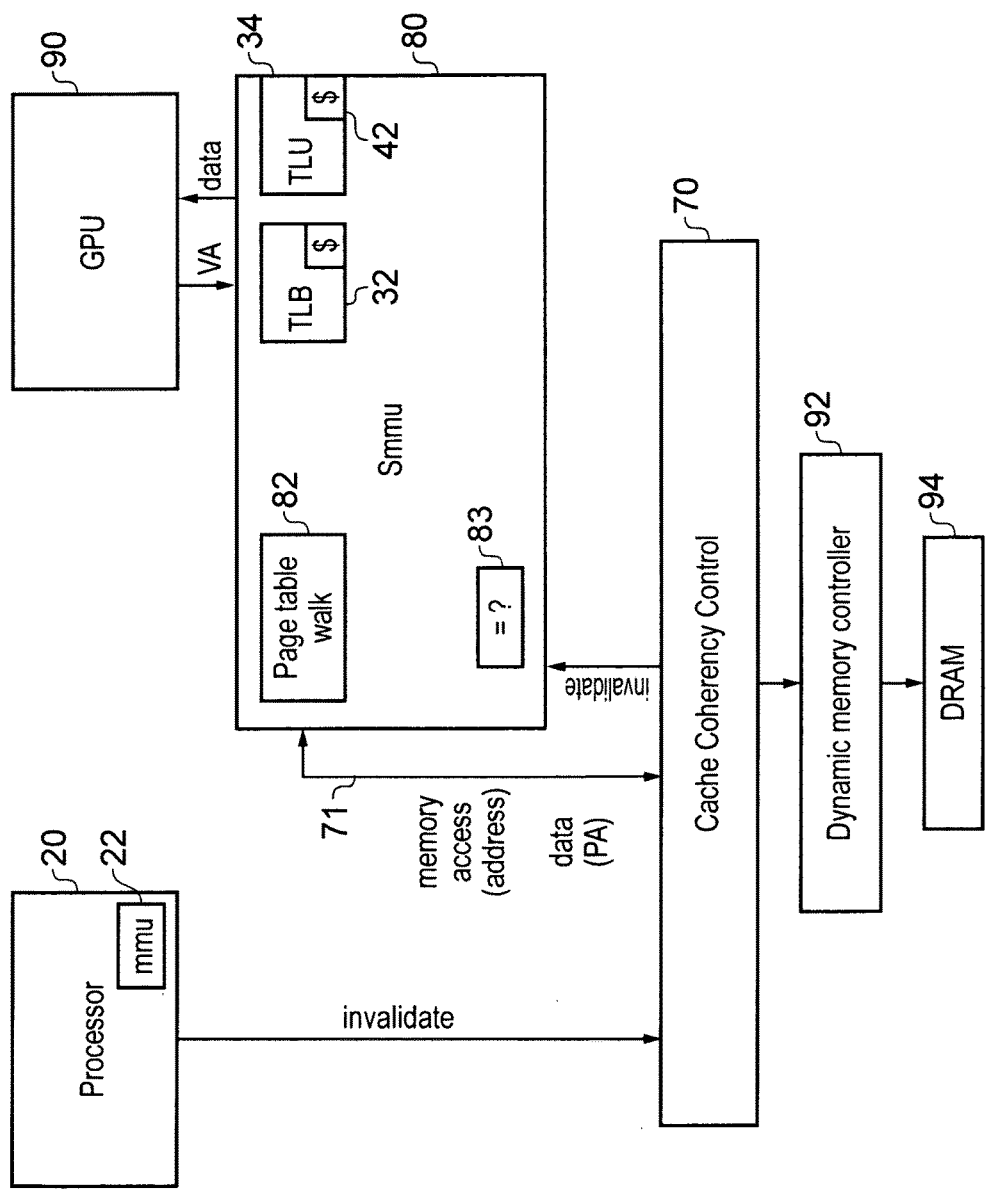
FIG. 6 shows a further example of a processing system according to the present technique.

FIG. 5 shows a particular example of the two RAMs where they are arranged as two four set associative caches. This is a convenient way to store the data in an easy to access manner. The line selection for each cache is performed as a function of the virtual address and size of block mapping and the particular selected will depend on the history of the cache. FIG. 6 shows a further example of a processing system according to an embodiment of the present technique where a processor 20 and a peripheral graphics processing unit GPU 90 use virtual addresses in their processing. Processor 20 has its own memory management unit MMU 22 that manages the translations of the virtual to physical addresses. There is a system memory management unit SMMU 80 which manages the virtual to physical address translations of the peripheral devices. SMMU 80 has a micro TLB 32, and a translation look aside unit 34 that has caches 42 within it which include a macro TLB and a prefetch buffer and in some embodiments the walk cache and IPA2PA caches as shown in FIGS. 4 and 5. There is also page table walk control circuitry 82 that controls access to the pages of translations stored in main memory.

There is also cache coherency control circuitry 70 that controls coherency of the caches including the caches within SMMU 80. The cache coherency control circuitry 70 also ensures that SMMU 80 is coherent with the internal MMU 22 of processor 22. Thus, the processor 20 sends invalidation requests to the SMMU via the cache coherency control circuitry 70.

The SMMU 80 communicates with the cache coherency circuitry 70 via a memory access bus, such as an AXI bus made by ARM® Ltd. of Cambridge UK. The AXI bus has separate read, write and control channels and in some embodiments allows two requested items to be fetched in a single cycle. Thus, where a page table walk is being performed and the requested items are address translations, a requested address translation and a subsequent address translation can be returned in a same cycle. There is also an invalidate channel from the cache control circuitry 70 to the SMMU 80.

Intermittently when processing instructions a context may change and the translations that were used for that context may need to be invalidated such that the physical addresses can be used in the new context. A context may be a thread or an application processed by the processor or one of the peripherals. Invalidation of these translations may take some time and if cache coherency circuitry is being used it is possible that although an invalidate request has been received there may still be lookup and update requests being processed by the SMMU 80 and the cache coherency control circuitry 70 for entries that are to be invalidated. Performing updates and looking these up is clearly a waste of power if they are to be invalidated and therefore in preferred embodiments where an invalidate request has been received at the SMMU 80 any subsequent request to look up entries that are subject to that invalidate request will return a miss and the look up will not be performed. It should be noted that an invalidate request may come from software on the processor that detects a change in context on one of the masters and as the page tables used by that context are no longer required they should be invalidated such that pages tables that are to be used can be stored in the caches. Similarly, update requests will just be dropped and no update will be performed. This avoids the caches being accessed unnecessarily and saves power.

This may be implemented in some embodiments by a simple comparator 83 within the SMMU which stores the identifier for the context that has been invalidated in response to an invalidate request being received. In some embodiments the identifier is stored as a vector indicating multiple contexts that are to be invalidated simultaneously. The context of any request is used to index into this vector to check if the relevant context is being invalidated. Thus, the context of any transaction request that is received is compared with this stored value and where there is a match, the requests are either dropped if they are update requests or a miss is signalled if they are lookup requests. Where they are update requests an accept signal is sent back to indicate that the request has been accepted such that no stalling of subsequent transactions occurs in the device sending the request.

In operation a virtual address that is to be accessed by the GPU 90 is sent to SMMU 80 and the micro TLB 32 and then the caches in the TLU 34 are accessed. If the translation is not found then a page table walk under control of page table walk control circuitry 82 will be performed. It should be noted that this page table walk may be facilitated by access to the IPA to PA cache and the walk cache in TLU 34. Furthermore, values retrieved during the page table walk are sent to the caches in SMMU 80 which are updated with these values. These accesses are controlled by cache coherency control circuitry 70 which manages the coherency of the entries in the various data stores and ensures that where a value has been updated the most recent value is always returned.

Figure 7:
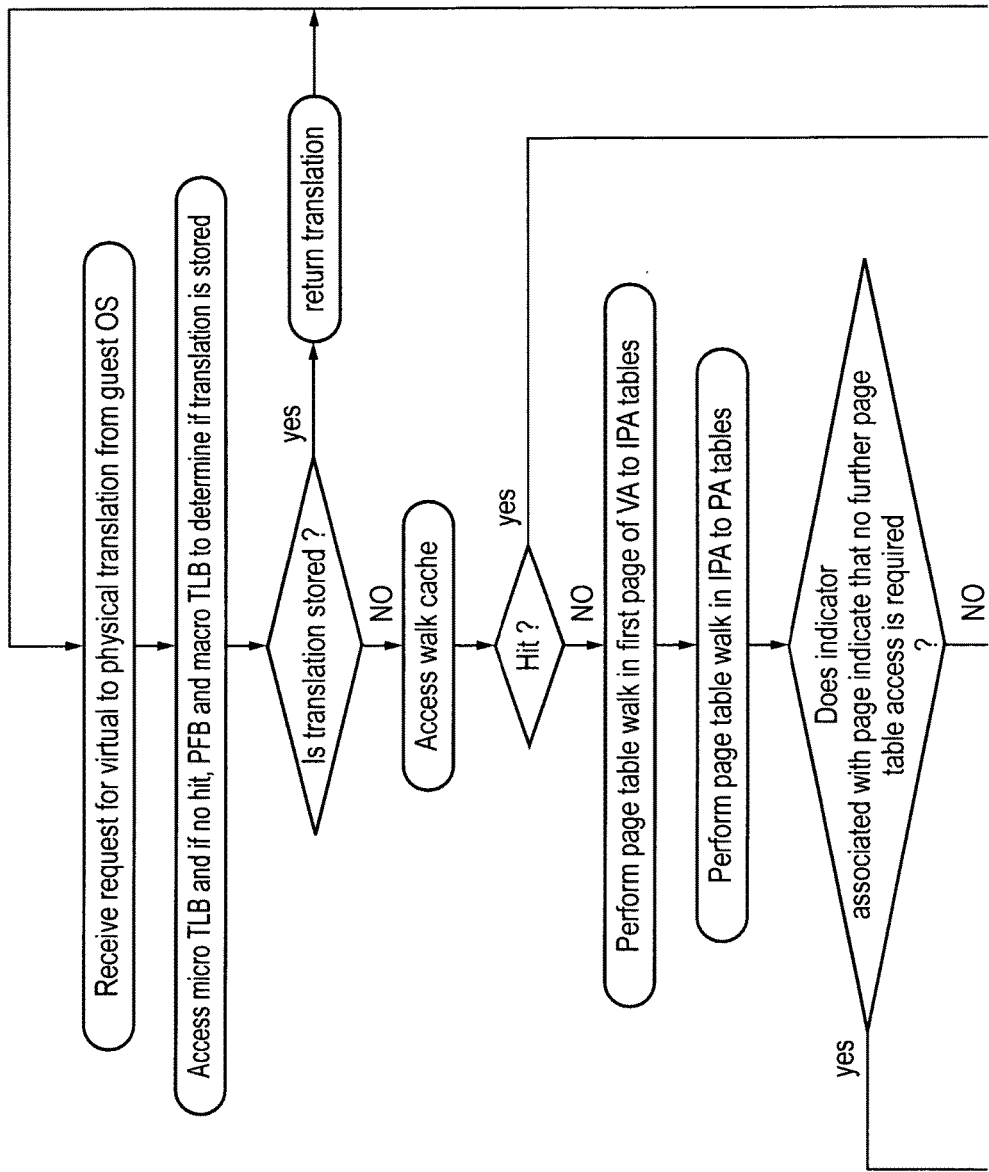
FIG. 7 shows a flow diagram illustrating steps in a method of performing a VA to PA translation according to the present technique.
Figure 7:
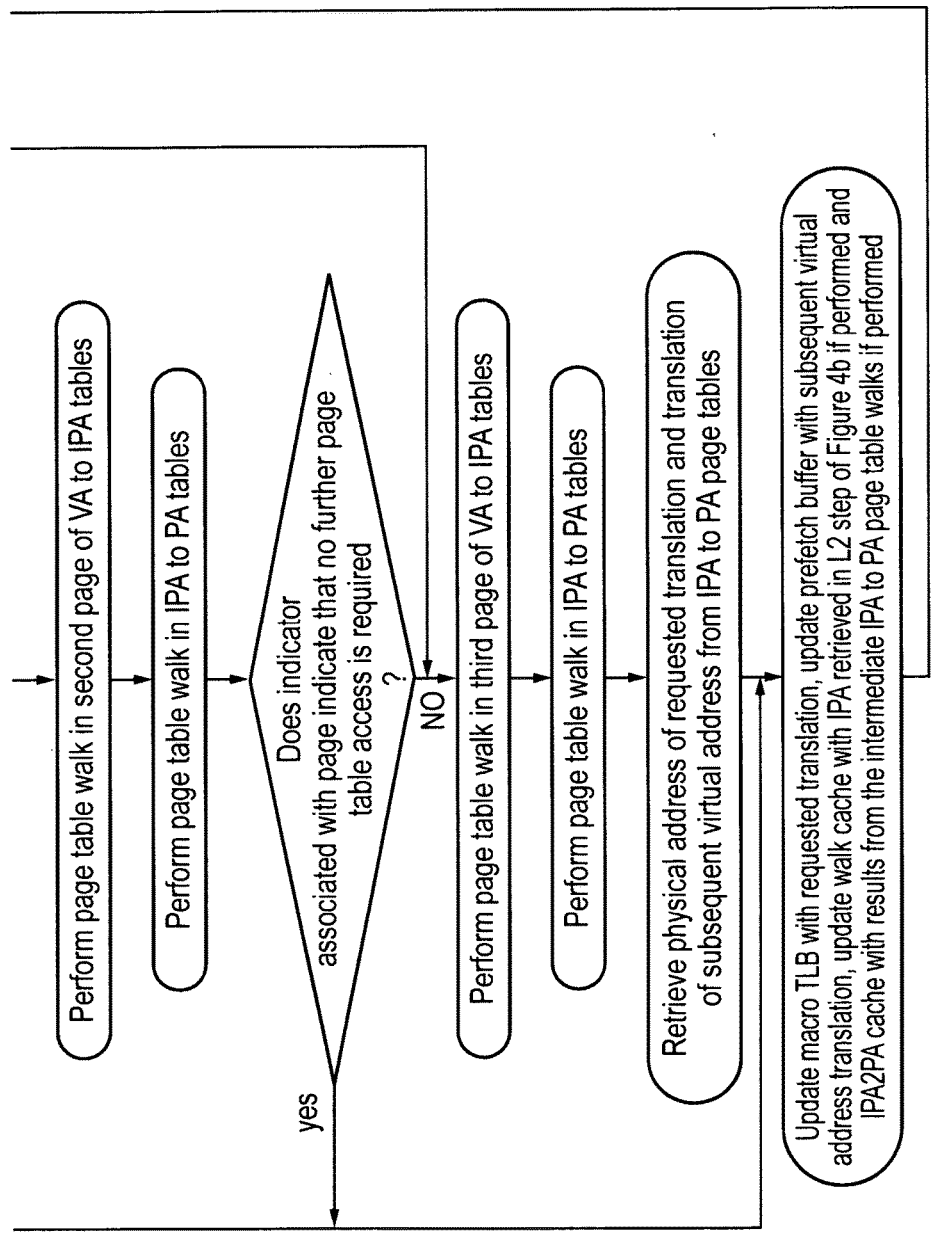

FIG. 7 shows a flow diagram illustrating steps in a method according to the current technique. Initially a request for a virtual to physical translation is received and the micro TLB cache is queried to see if it is stored in it. If it is not the prefetch buffer and macro TLB are queried. If the translation is stored in either then the requested translation is returned to the requester.

If it is not then a page table walk is required. Initially the walk cache is accessed to see if the first steps in the translation have been performed and the value stored, if so then these values are retrieved and method jumps to performing the page walk in the third pages of the VA to IPA tables and the IPA to PA tables.

If there is not a hit in the walk cache then the first page of the VA to IPA tables are queried and then the translation for the requested address and for a subsequent address is retrieved. These addresses are used to query the IPA to PA page tables. If the indicator associated with the queried pages indicates that the address is mapped in a large sized block, then no further page table walks are required and the results are returned and the macro TLB and prefetch buffer are updated with the results. The stored mappings are indexed within the cache by the virtual address and page table size.

If the indicator associated with the queried pages indicates that the address is mapped in a smaller sized block then a further page table walk is performed in first the VA to IPA tables and then using the retrieved IPAs the IPA to PA tables. Once again it is determined if the indicator associated with the page indicates that a further page should be accessed. If no then the results are stored in the prefetch buffer and macro TLB.

If a further page table walk is required then this is performed in firstly the VA to IPA tables and then the IPA to PA tables. The result from the VA to IPA page table walk is stored in the walk cache, while the results from the previous IPA to PA walks are stored in the IPA2PA cache. The final results for the requested translation and subsequent translation are stored in the macro TLB and prefetch buffer respectively.

It should be noted that the subsequent translation that is retrieved may be the consecutive translation that is the translation for the next virtual address, or it may be the translation that it is predicted will be required next which may not be the consecutive translation.

The steps in the flow diagram of FIG. 7 relate to the Stage 1 translation S1 steps of FIG. 4b.

Figure 8:
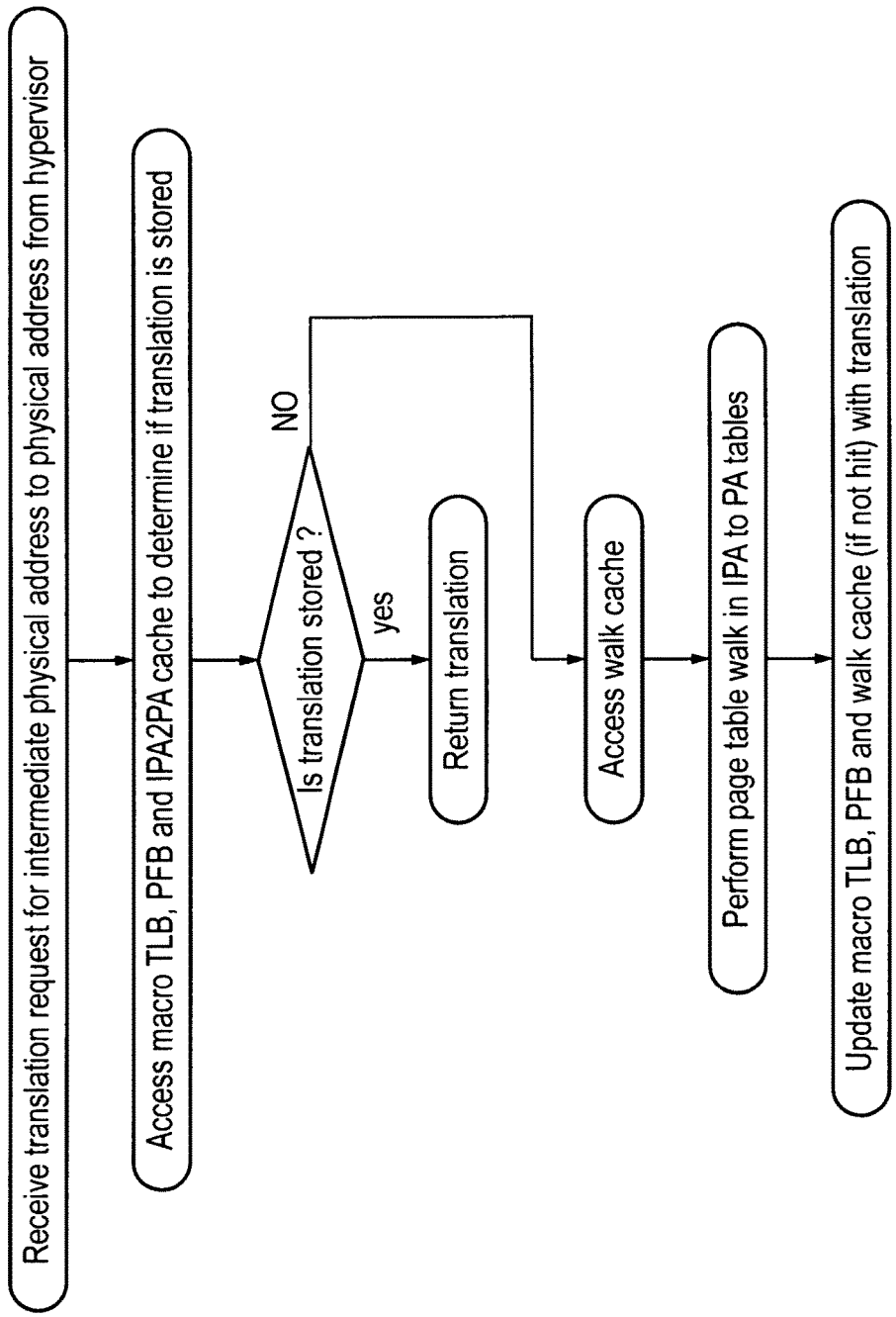
FIG. 8 shows a flow diagram illustrating steps in a method of performing an IPA to PA translation according to the present technique.

FIG. 8 shows the steps in the method of an IPA to PA translation initiated by the hypervisor in response to a request from an initiator. This request is received at the SMMU which looks up in the macro TLB, prefetch buffer and IPA2PA cache to determine if the translation is stored. If it gets a hit, then the translation is returned.

If there is not a hit then the walk cache is looked at and then a page table walk in the IPA to PA tables is performed, this will be an easier walk if there is a hit in the walk cache as some of the steps or walks of the translation will be known.

The macro TLB, prefetch buffer and walk cache (if it was not hit) are then updated with the retrieved values.

An IPA to PA translation may also be initiated as part of a VA to PA translation request that comes from an initiator and is triggered by a guest OS running to on the initiator. When this request arrives at the SMMU, it looks up all its caches to check for a hit, such as is shown in FIG. 7. If it gets a hit it doesn't perform any translation (unless the hit is in the walk cache), otherwise if performs the required translations. Now one (or more) of these required translation will be a full IPA to PA translation request which is internally required to complete the VA to PA translation. For this it looks up the macro TLB, prefetch buffer and the walk cache to check for entries stored there by the process shown in FIG. 8 and the IPA2PA cache to check for entries stored there during this process, that is during the IPA to PA part of a VA to PA translation. On completion the macro TLB, prefetch buffer, walk cache (if it was not hit) are updated with the VA to PA results and the IPA2PA cache with all the IPA to PA results.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

I claim:

1. A data processing apparatus comprising:
   at least one initiator device for issuing transactions,
   a hierarchical memory system comprising a plurality of caches and a memory and memory access control circuitry,
   said initiator device being configured to identify storage locations using virtual addresses,
   said hierarchical memory system being configured to store data using physical addresses,
   said memory access control circuitry being configured to control virtual address to physical address translations; wherein:
   said plurality of caches comprise a first cache and a second cache;

said first cache being configured to store a plurality of address translations of virtual to physical addresses that said initiator device has requested;

said second cache being configured to store a plurality of address translations of virtual to physical addresses that it is predicted that said initiator device will subsequently request;

said first and second cache are arranged in parallel with each other such that said first cache can be accessed during an access cycle in response to receipt of a request for an address translation from said initiator device, and said second cache can be accessed during said same access cycle in response to receipt of said request for said address translation from said initiator device; and said memory access control circuitry is configured, in response to receipt of said request for said address translation from said initiator device, to look for said translation in said first cache and said second cache and in response to said requested translation not being present:
  to retrieve said translation from a lower hierarchical data store and
  to retrieve a translation for a predicted subsequently required virtual address while accessing said lower hierarchical data store and
  to update said first cache with said retrieved translation and said second cache with said retrieved predicted subsequently required translation at a same time.

2. A data processing apparatus according to claim 1, wherein said first cache comprises a macro table lookaside buffer and said second cache comprises a prefetch buffer.

3. A data processing apparatus according to claim 1, wherein said first cache and said second cache comprise level two caches, said data processing apparatus comprising a level one cache comprising a micro table lookaside buffer, said memory being configured to store address lookup tables comprising virtual to physical address translations.

4. A data processing apparatus according to claim 1, wherein said memory access control circuitry is configured in response to detecting said requested translation in said second cache to transfer said translation to a same line of said first cache.

5. A data processing apparatus according to claim 1, said data processing apparatus comprising a data processing apparatus configured to operate a double virtualisation system that uses a set of virtual addresses and a set of intermediate physical addresses, wherein an operating system operating on said data processing apparatus uses said set of virtual addresses and said intermediate set of physical addresses, and a hypervisor manages the memory space by translating said set of intermediate physical addresses to physical addresses, said data processing apparatus further comprising:
  a third cache and a fourth cache;
  said third cache being configured to store a plurality of partial virtual to physical address translations, said partial translations comprising translations for higher bits of said addresses, said partial translations forming an input to a lookup to memory required for completing said translations; and
  said fourth cache being configured to store a plurality of partial translations of said intermediate physical addresses to corresponding physical addresses, said plurality of partial translations corresponding to results from lookup steps performed in lookup tables in said memory during said translation; wherein said memory access control circuitry is configured to store in said fourth cache a final step in said intermediate physical address to physical address translation at a same time as storing said partial translation in said third cache.

6. A data processing apparatus according to claim 5, wherein said third cache comprises a walk cache and said fourth cache comprises an IPA2PA translation lookaside buffer.

7. A data processing apparatus according to claim 1 wherein
  said first cache comprises a first four-set associative RAM; and
  said second cache comprises a second four-set associative RAM.

8. A data processing apparatus according to claim 5, wherein said first, second, third and fourth caches are formed from two RAMs, said first and second caches being on different RAMs and said third and fourth caches being on different RAMs.

9. A data processing apparatus according to claim 1, wherein said memory access control circuitry is configured to detect a request to invalidate a set of translations for a context and in response to detection of said invalidate request to perform said invalidation and while said invalidation is pending:
  to determine whether any update or lookup requests for said context to be invalidated are received; and
  in response to detecting a lookup request said memory access control circuitry is configured to signal a miss in said plurality of caches without performing said lookup; and
  in response to detecting an update request said memory access control circuitry is configured to transmit an accept reply to said update request and not perform said update.

10. A method of storing virtual to physical address translations in a plurality of caches comprising a first cache and a second cache, wherein said first cache can be accessed during an access cycle in response to receipt of a request for an address translation, and said second cache can be accessed during said same access cycle in response to receipt of said request for said address translation from said initiator device the method comprising the steps of:
  receiving a request for a virtual to physical address translation from an initiator device;
  in response to determining that said address translation is not stored in one of said first cache and said second cache:
  retrieving said translation from a lower hierarchical data store and also retrieving a translation for a predicted subsequently required virtual address while accessing said lower hierarchical data store; and
  updating said first cache with said retrieved translation and said second cache with said retrieved predicted subsequently required translation in a same access cycle.

11. A method according to claim 10, wherein said first cache comprises a macro table lookaside buffer and said second cache comprises a prefetch buffer.

12. A method according to claim 11, wherein said first cache and said second cache comprise level two caches, and said lower hierarchical data store comprises a memory storing address lookup tables comprising virtual to physical address translations.

13. A method according to claim 10, wherein the address translations are for addresses in a double virtualisation system that uses a set of virtual addresses and a set of intermediate physical addresses, an operating system operating on a data processing apparatus using said set of virtual addresses and said intermediate set of physical addresses, and a hypervisor managing the memory space by translating the set of intermediate physical addresses to physical addresses with said data processing apparatus the method further comprising:

storing in a third cache at least one partial virtual to intermediate physical address translation, said partial translation comprising a translation for higher bits of said addresses, said partial translation forming an input to a lookup to memory required for completing said translation; and in a same step storing in a fourth cache a final step in said intermediate physical address to physical address translation.

14. A method according to claim 13, wherein said third cache comprises a walk cache and said fourth cache comprises an IPA2PA translation lookaside buffer.

15. A method according to claim 10, comprising a further step of:

detecting a request from said initiator device to invalidate a set of translations for a context;

responding to said request by performing said invalidation and while said invalidation is pending:
    determining whether any update or lookup requests for said context are received; and
    in response to detecting a lookup request, signalling a miss in said plurality of caches without performing said lookup; and
    in response to detecting an update request transmitting an accept reply to said update request and not performing said update.

16. A data processing apparatus comprising:

at least one initiator means for issuing transactions, a hierarchical memory system comprising a plurality of caches, a memory, and means for controlling memory access, said initiator means being configured to identify storage locations using virtual addresses, said hierarchical memory system being configured to store data using physical addresses, said means for controlling memory access being configured to control virtual address to physical address translations; wherein said plurality of caches comprise a first means for caching and a second means for caching;

said first means for caching configured to store a plurality of address translations of virtual to physical addresses that said initiator means has requested;

said second means for caching configured to store a plurality of address translations of virtual to physical addresses that it is predicted that said initiator means will subsequently request; wherein:

said first and second caching means are arranged in parallel with each other such that said first caching means can be accessed during an access cycle in response to receipt of a request for an address translation from said initiator means, and said second caching means can be accessed during said same access cycle in response to receipt of said request for said address translation from said initiator means; and said means for controlling memory access is configured, in response to receipt of said request for said address translation from said initiator means, to look for said translation in said first means for caching and said second means for caching and in response to said requested translation not being present:
    to retrieve said translation from a lower hierarchical data storage means and
    to retrieve a translation for a predicted subsequently required virtual address while accessing said lower hierarchical data storage means and
    to update said first means for caching with said retrieved translation and said second means for caching with said retrieved predicted subsequently required translation at a same time.

* * * * *